(12) United States Patent
Ketheesan et al.

(10) Patent No.: US 8,917,641 B2
(45) Date of Patent: *Dec. 23, 2014

(54) SYSTEMS, STRUCTURES AND ASSOCIATED PROCESSES FOR OPTIMIZATION OF STATE TRANSITIONS WITHIN WIRELESS NETWORKS

(71) Applicant: Venturi IP LLC, New York, NY (US)

(72) Inventors: Kanapathipillai Ketheesan, San Francisco, CA (US); Krishna Ramadas, Cupertino, CA (US); Chico Jayanthan, San Ramon, CA (US); David Choi, Cupertino, CA (US)

(73) Assignee: Venturi IP LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,079

(22) Filed: Dec. 13, 2012

(65) Prior Publication Data

US 2013/0107744 A1     May 2, 2013

Related U.S. Application Data

(63) Continuation of application No. 12/632,700, filed on Dec. 7, 2009, now Pat. No. 8,351,358.

(60) Provisional application No. 61/181,634, filed on May 27, 2009, provisional application No. 61/227,371, filed on Jul. 21, 2009.

(51) Int. Cl.
*H04B 7/00* (2006.01)
*H04W 24/02* (2009.01)
*H04L 12/24* (2006.01)
*H04L 12/26* (2006.01)

(52) U.S. Cl.
CPC ........... *H04W 24/02* (2013.01); *H04L 41/0893* (2013.01); *H04L 43/10* (2013.01)
USPC ........................................................ 370/310

(58) Field of Classification Search
CPC .................... H04W 52/0209; H04W 52/0212; H04W 52/0225; H04W 52/0251
USPC ................. 370/310, 311, 328, 349, 464, 465; 455/403, 422, 450–453; 709/227–229, 709/238
See application file for complete search history.

(56) References Cited

U.S. PATENT DOCUMENTS 6,212,175 B1   4/2001   Harsch
6,275,712 B1   8/2001   Gray et al.
(Continued)

FOREIGN PATENT DOCUMENTS

DE           EP 1973 355    *   9/2008   ............... H04Q 7/32

OTHER PUBLICATIONS

Bryant, et al., "Computer Systems: A Programmer's Perspective", 2003; 1st edition; Pearson publishing, Chapter 12, pp. 779-793.

(Continued)

*Primary Examiner* — Dmitry H Levitan
(74) *Attorney, Agent, or Firm* — KPPB LLP

(57) ABSTRACT

A system for optimizing communications on a radio network by altering transitions between different link states that includes several modules. The activity, environment, and load module monitor monitors the link layer based on spectral-load metrics and radio-link metrics. The state transition control module determines when user equipment transitions between different states based on the type of user equipment, user equipment battery life, whether the user equipment is connected to an alternating current outlet, a spectral cost, and a backhaul cost. The channel state influencer module uses any of direct messages, ping messages, and keep-alive messages to influence the link state. The policy and preference handler enables or disables transitions based on the bearer technology type, the type of user equipment, the user's subscription plan, and the load level on the network.

27 Claims, 13 Drawing Sheets

(56) References Cited

U.S. PATENT DOCUMENTS

| | | | |
|---|---|---|---|
| 6,829,493 B1 * | 12/2004 | Hunzinger | 455/574 |
| 7,436,779 B1 | 10/2008 | Mangal et al. | |
| 7,471,654 B2 | 12/2008 | Mueckenheim et al. | |
| 7,848,279 B2 | 12/2010 | Ranta-aho et al. | |
| 7,965,668 B2 * | 6/2011 | Zhang et al. | 370/311 |
| 8,068,446 B2 | 11/2011 | Noh et al. | |
| 2011/0116427 A1 | 5/2011 | Chang et al. | |

OTHER PUBLICATIONS

Perez-Costa, X et al., "Optimal Radio Acess Bearer Configuration for Voice over IP in 3G UMTS networks", In Proc. of the 5th European Wireless (EW), Barcelona, Spain, 6 pages., Feb. 2004.

QUALCOMM, , "UMTS/HSDPA Backhaul Bandwidth Dimensioning", 80-W1193-1, Revision A; ESG (Engineering Services Group), 29 pages., May 18, 2007.

Wortham, Jenna , "Customers Angered as iPhones Overload AT&T", retrieved online from nytimes.com, 3 pages., Sep. 3, 2009.

* cited by examiner

| Time | GMM-State | | RRC-Message | RRC-State | |
|---|---|---|---|---|---|
| | | | | | |
| 1.078 | GMM_REGISTERED | | | | |
| 2.166 | | | UL/RB-Reconfig-Comp | | |
| 5.482 | | | UL/Phy-Chan-Reconfig-Comp | | |
| 7.108 | | | | CELL_FACH | |
| 7.217 | | | UL/Cell-Update | | |
| 7.385 | | | UL/RB-Reconfig-Comp | | |
| 7.560 | | | DL/RRC-Conn-Setup | | |
| 9.516 | | | UL/RB-Reconfig-Comp | | |
| 9.516 | | | | CELL_DCH | |
| 12.163 | | | UL/Phy-Chan-Reconfig-Comp | | |
| 13.597 | | | DL/RB-Reconfig | | |
| 14.287 | | | | CELL_FACH | |
| 14.397 | | | UL/Cell-Update | | |
| 14.586 | | | UL/RB-Reconfig-Comp | | |
| 21.342 | | | UL/RRC-Conn-Rel-Comp | | |
| 21.532 | | | | Disconnected | |

FIG. 1

| Time | GMM State | | RRC Msg | RRC State |
|---|---|---|---|---|
| | | | | |
| 1.123 | GMM_REGISTERED | | | |
| 2.259 | | | UL/RB Reconfig Comp | |
| 6.257 | | | UL/Phy Chan Reconfig Comp | |
| 7.588 | | | | CELL_FACH |
| 7.697 | | | UL/Cell Update | |
| 7.895 | | | UL/RB Reconfig Comp | |
| 14.643 | | | UL/RRC Conn Rel Comp | |
| 14.823 | | | | Disconnected |
| 23.144 | GMM_SERVICE_REQUEST_INITIATED | | | |
| 23.428 | | | UL/RRC Conn Request | |
| 23.429 | | | | Connecting |
| 23.992 | | | UL/RRC Conn Setup Comp | |
| 23.999 | | | | CELL_DCH |
| 24.026 | | GMM/Service Request | | |
| 24.590 | GMM_REGISTERED | | | |
| 25.877 | | | UL/RB Reconfig Comp | |
| 30.768 | | | | CELL_FACH |
| 30.868 | | | UL/Cell Update | |
| 31.047 | | | UL/RB Reconfig Comp | |
| 37.803 | | | UL/RRC Conn Rel Comp | |
| 37.984 | | | | Disconnected |

*FIG. 2*

Achievable first data packet delay

| Time | GMM State | RRC Message | RRC State |
|---|---|---|---|
| 0.000 | GMM_SERVICE_REQUEST_INITIATED | | |
| 0.710 | | UL/RRC Conn Request | |
| 0.711 | | | Connecting |
| 1.080 | | UL/RRC Conn Setup Comp | |
| 1.081 | | | CELL_DCH |
| 1.107 | | GMM/Service Request | |
| 1.613 | GMM_REGISTERED | | |
| 2.710 | | UL/RB Reconfig Comp | |
| 9.862 | | DL/RB Reconfig | |
| 10.631 | | | CELL_FACH |
| 10.741 | | UL/Cell Update | |
| 10.939 | | UL/RB Reconfig Comp | |
| 17.755 | | UL/RRC Conn Rel Comp | |
| 17.947 | | | Disconnected |

*FIG. 13*

SYSTEMS, STRUCTURES AND ASSOCIATED PROCESSES FOR OPTIMIZATION OF STATE TRANSITIONS WITHIN WIRELESS NETWORKS

CROSS REFERENCE TO RELATED APPLICATIONS

This application is a Continuation of application Ser. No. 12/632,700, entitled Channel State Transition Optimization, filed on 7 Dec. 2009, which claims the benefit of U.S. Provisional Patent Application No. 61/181,634, Idle Wake Delay Optimization with VTP, filed 27 May 2009 and of U.S. Provisional Patent Application No. 61/227,371, Idle Wake Delay Optimization, filed 21 Jul. 2009, the entirety of each of which is incorporated herein by this reference thereto.

The Applicants hereby rescind any disclaimer of claim scope in the parent Application(s) or the prosecution history thereof and advise the USPTO that the claims in this Application may be broader than any claim in the Parent Application.

BACKGROUND OF THE INVENTION

1. Technical Field

This invention relates generally to the field of optimizing data transmission in a radio network. More specifically, this invention relates to minimizing the time between client and server communications by optimizing the link states.

2. Description of the Related Art

As people increasingly rely on personal computers, laptops, and mobile devices for information and entertainment, the demand for faster Internet access increases. The demand, however, is straining networks and resulting in dropped calls, poor cell-phone service, and delayed text and voice messages. See, for example, Jenna Wortham, *Customers Angered as iPhones Overload AT&T*, New York Times (Sep. 2, 2009). Many carriers are attempting to solve the problem by increasing their infrastructure in the form of new cell-phone towers to provide more bandwidth. Other companies are developing faster clients with new network technologies.

While these measures help to alleviate some of the problem, they are costly measures that ignore the overarching reason for the problem—delays incurred during a sequence of requests and responses that lead to poor user experience. Communication protocols, such as the transmission control protocol/internet protocol (TCP/IP) and application protocols, such as hypertext transfer protocols (HTTP) include delays between transitioning from different link states, read time for loading webpages, etc.

Typical usage patterns, as studied and observed by the 3$^{rd}$ Generation Partnership Project (3GPP), reveal that users typically load a website and read the first page before clicking on the second page. During this time, the link layer state typically transitions out of active state because of the inactivity. To access the second page, the user must wait for the link state to transition back to active, and then load the second page.

What is needed is a method for minimizing the time between client and server communications.

SUMMARY OF THE INVENTION

The present invention overcomes the deficiencies and limitations of the prior art by providing an optimization system for monitoring applications and link-layer activity, maintaining state, using difference mechanisms to influence link state transitions, and using policy and preferences to control transition management.

The optimization system comprises four modules. The activity, environment, and load monitor module monitors the link layer based on spectral-load metrics and radio-link metrics. The state transition control module determines when user equipment transitions between different states based on the type of user equipment, user equipment battery life, whether the user equipment is connected to an alternating current (A/C) outlet, a spectral cost, and a backhaul cost. The channel state influencer module influences the state transition based on any direct messages, ping messages, and keep-alive messages. The policy and preference handler enables or disables transitions based on the bearer technology type, the type of user equipment, the user's subscription plan, and the load level on the network.

The optimization engine is stored on user equipment, a network element, or a combination of both the user equipment and the network element.

BRIEF DESCRIPTION OF THE DRAWINGS

FIG. 1 illustrates the delay for transitioning between different radio resource control states from forward access channel to disconnect;

FIG. 2 illustrates the delay associated with transitioning from disconnect to dedicated channel;

FIG. 13 illustrates the achievable first packet delay.

DETAILED DESCRIPTION OF THE INVENTION

Figure 3:
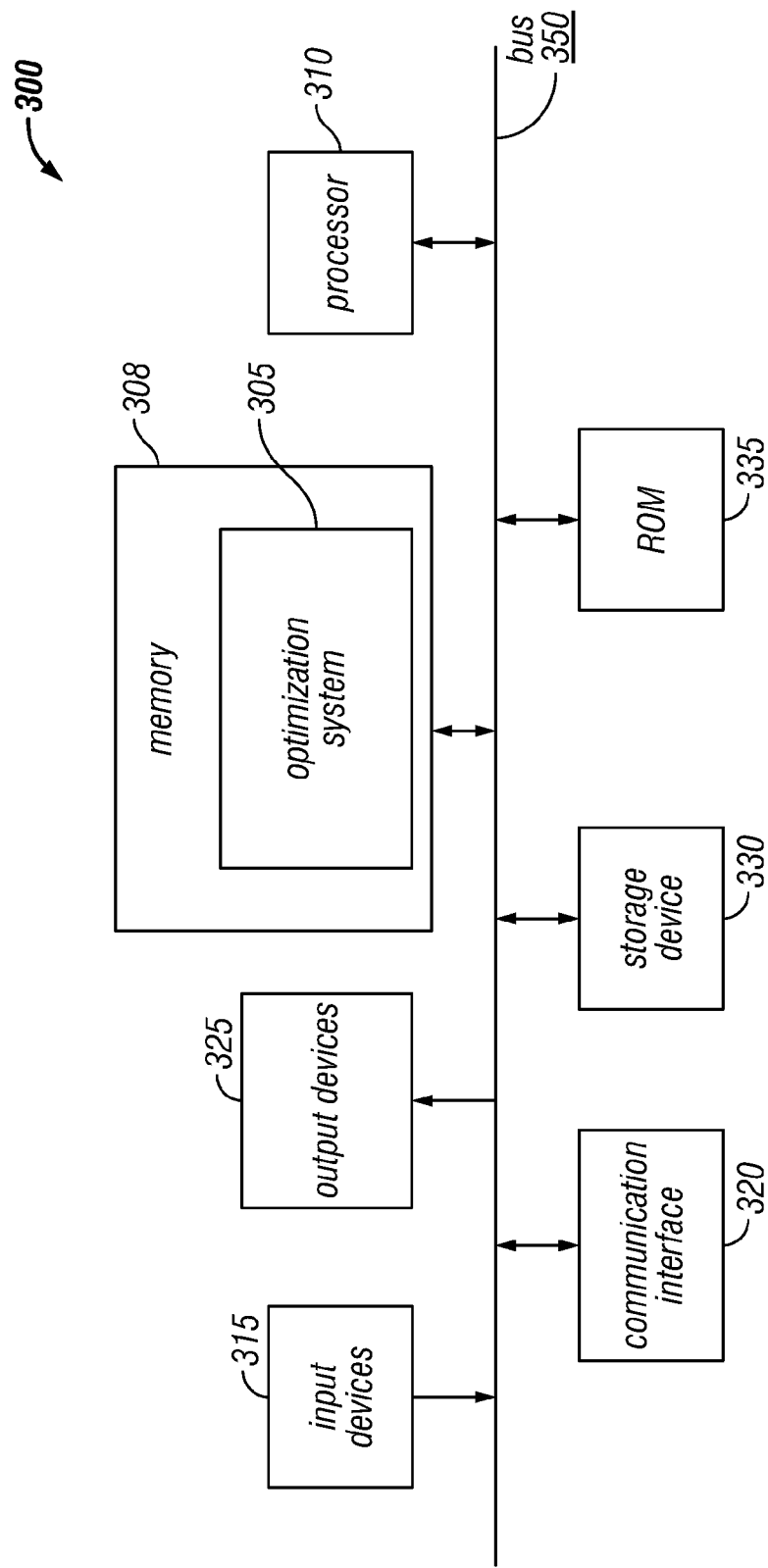
FIG. 3 illustrates a preferred embodiment of a memory structure.

In one embodiment, the invention comprises a method and/or an apparatus that reduce waiting times during wireless communications.

Clients and servers communicate with each other over the Internet by running software that implements a communications protocol, such as TCP/IP and an application protocol, such as HTTP. The communications model is described using a protocol with four layers: a link layer, an Internet protocol layer, a transport layer, and an application layer. The link layer is used to interact with host (client and server) hardware. The link layer interconnects hosts and nodes in the network. The Internet protocol layer is used to transport packets from the originating host across network boundaries to the destination host. The transport layer is used to deliver data to the appropriate application process on the host. The application layer is used to facilitate application process-to-process communications. Persons of ordinary skill in the art will recognize that the protocol stack can include additional layers, such as a session layer in the case of an Open Systems Interconnection (OSI) model.

When communicating over a wireless network, the end user's device, i.e. the client, is referred to as user equipment. The user equipment connects to a base transceiver station (BTS), which is also referred to as Node B. Node B contains radio frequency (RF) transmitters and a receiver that are used to communicate with the user equipment.

A wireless service network maintains a radio link layer channel with the user equipment based upon the readiness of the radio link layer to carry subscriber traffic. For example, in the popular mobile broadband high speed packet access (HSPA) network, the radio resource control (RRC) includes three connected states: idle, ready, and intermediate. The ready state is called CELL_DCH, which refers to the dedicated channel. The subscriber radio link enters into a CELL_DCH state after a login. Necessary radio link layer resources are available to the user in this state to quickly send and receive data packets over the radio link layer. A subscriber successfully downloads a web page to the web browser in the CELL_DCH state.

The intermediate state is CELL_FACH, which refers to the forward access channel. If, for example, while the user is browsing the Internet the user equipment is idle for five seconds, the radio link transitions from CELL_DCH to the CELL_FACH (forward access channel) state, which consumes about 50% less energy than the CELL_DCH state. If the user equipment is idle for 7 more seconds, the user equipment's radio link transitions into a RRC disconnect state.

A user equipment radio link layer transitions back to the CELL_DCH state before a follow-on page request message can be delivered through the radio link. A traditional delay from CELL_FACH to CELL_DCH is approximately 2.1 seconds. Transition delay from RRC disconnected to CELL_DCH is 1 seconds or even longer. Transition delays from these states contribute to subscriber perception that the wireless client is responding poorly.

FIGS. 1 and 2 illustrate RRC states and transition delays. The highlighted entries in the time column for FIG. 1 illustrate the transition delay between the forward access channel state and the dedicated channel state. The highlighted entries in FIG. 2 illustrate transition delay between the disconnected state and the dedicated channel state.

Configuring the radio link layer timer settings to extend stay in the CELL_DCH state for all subscribers is not a viable solution because it wastes radio link layer resources unnecessarily. The present invention avoids radio resource contention while improving user perception of responsiveness by controlling the link states. The optimization system extends the duration of the ready state based on the type of traffic, the subscription plan, and the degree of congestion of a radio link, etc. Users perceive the responsiveness of mobile devices according to the responsiveness of transactional applications, such as a web browser, rather than background applications, such as peer-to-peer (P2P) networking. Thus, the optimization system focuses on increasing visible responsiveness rather than all responses.

System Architecture

In one embodiment, the optimization system is stored on a client device, such as a personal computer, a notebook, a smart phone, a digital media player, a personal digital assistant, etc. FIG. 3 is a block diagram of a client 300 according to one embodiment of the invention. The client 300 includes a bus 350, a processor 310, a main memory 308, a read only memory (ROM) 335, a storage device 330, one or more input devices 315, one or more output devices 325, and a communication interface 320. The bus 350 includes one or more conductors that permit communication among the components of the client 300.

The processor 310 includes one or more types of conventional processors or microprocessors that interpret and execute instructions. Main memory 308 includes random access memory (RAM) or another type of dynamic storage device that stores information and instructions for execution by the processor 305. ROM 335 includes a conventional ROM device or another type of static storage device that stores static information and instructions for use by the processor 310. The storage device 330 includes a magnetic and/or optical recording medium and its corresponding drive.

Input devices 315 include one or more conventional mechanisms that permit a user to input information to a client 300, such as a keyboard, a mouse, etc. Output devices 325 include one or more conventional mechanisms that output information to a user, such as a display, a printer, a speaker, etc. The communication interface 320 includes any transceiver-like mechanism that enables the client 300 to communicate with other devices and/or systems. For example, the communication interface 320 includes mechanisms for communicating with another device or system via a network.

The software instructions that define the monitoring system 308 are to be read into memory 308 from another computer readable medium, such as a data storage device 330, or from another device via the communication interface 320. The processor 310 executes computer-executable instructions stored in the memory 308. The instructions comprise object code generated from any compiled computer-programming language, including, for example, C, C++, C# or Visual Basic, or source code in any interpreted language such as Java or JavaScript.

Figure 4:
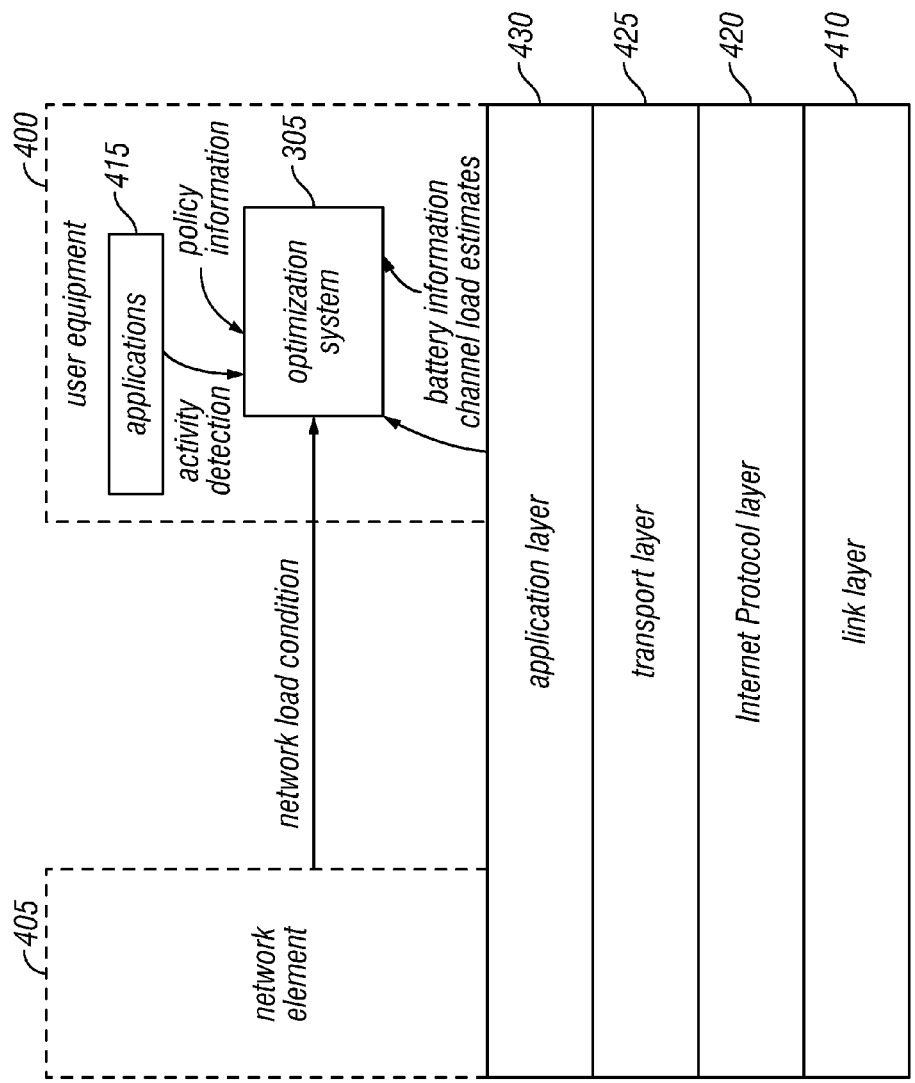
FIG. 4 illustrates a block diagram of an embodiment of an optimization system stored on the user equipment.

FIG. 4 is a block diagram of a network where the optimization system 305 is stored on the user equipment 400. The network is any radio network, such as the HSPA network, a code division multiple access (CDMA) network, the worldwide interoperability for microwave access (WiMAX) network, and long term evolution (LTE). The network element 405 is hardware that transfers information to the user equipment 400, such as a host, a node, a gateway, a router, etc. FIG. 4 illustrates the link layer 410, the Internet protocol layer 420, the transport layer 425, and the application layer 430 as discussed in more detail above.

The optimization system 305 monitors application and/or link layer activity, maintains states, uses different mechanisms to influence radio link layer transitions, and manages transitions using policy and/or preferences. The optimization system 305 monitors application activity by receiving activity detection direction from the applications 415. The optimization system 305 monitors the link layer activity by receiving channel load estimates from the link layer 410. Network load condition information is received from the network element 405. The optimization system 305 manages transitions by receiving policy information and battery/alternating current information internally.

Figure 5:
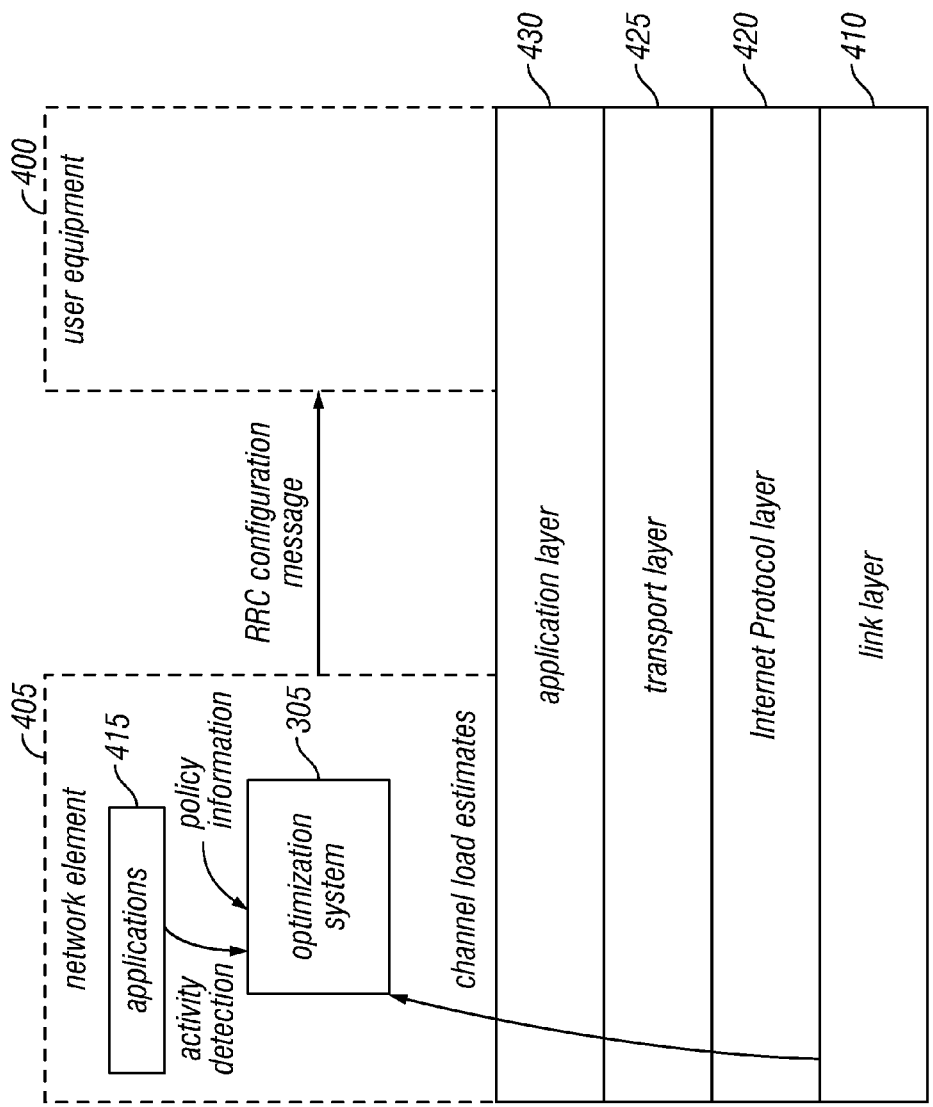
FIG. 5 illustrates a block diagram of an embodiment of an optimization system stored on the network element.

FIG. 5 illustrates a block diagram of a network where the optimization system 305 is stored on the network element 405. In one embodiment, the optimization system 305 is stored on (1) a radio access network (RAN) edge node or RAN core equipment, such as Node B or a radio network controller (RNC) or (2) a gateway server, such as an optimization engine. In this instantiation, the network element 405 utilizes existing link layer 410 control protocol, namely RRC configuration messages, to manage state transitions on the user equipment 400. This approach is suitable for supporting user equipment 400 that does not have the capacity to offer the possibility to host the optimization system 305.

Modules

Figure 6:
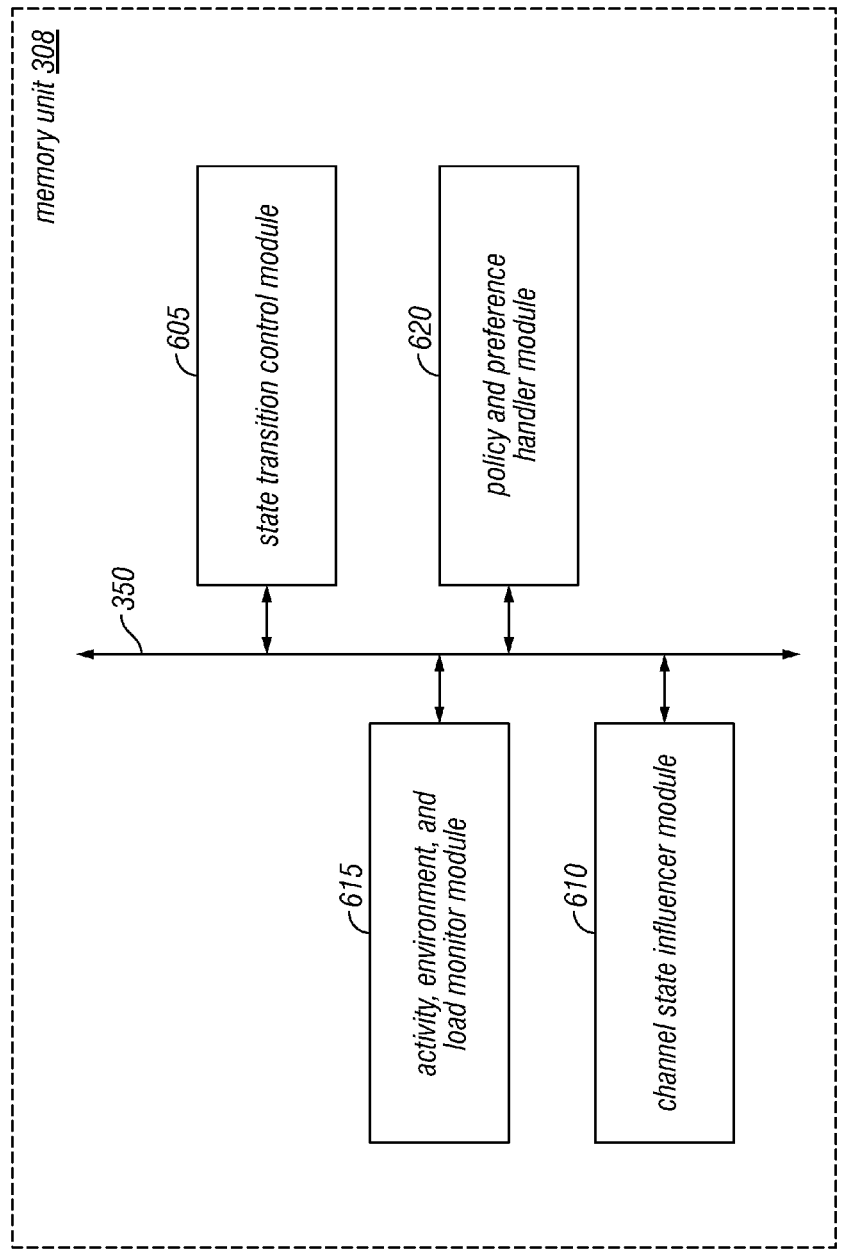
FIG. 6 illustrates a block diagram of an embodiment of the memory of the optimization system.

FIG. 6 illustrates one embodiment of the memory 308 constructed according to the present invention that stores multiple modules. The state transition control module 605; the channel state influencer module 610; the activity, environment, and load monitor module 615; and the policy and preference handler module 620 are coupled to the bus 350.

Activity, Environment, and Load Monitor Module

The activity, environment, and load monitor module 615 monitors the link layer 410 using spectral load metrics or radio link metrics. All link layer metrics are available when the ability to monitor resides on the RAN edge node or RAN core equipment or a gateway server.

The activity, environment, and load monitor module 615 monitors the application layer 430 by receiving information on the state of packets waiting to be transmitted from buffer pools in the protocol stack layer at the transport layer 425, key stroke entry or mouse click information entered within an application window, and a recognition of user session transitioning into a data transfer phase by observing signaling protocol message.

Application layer monitoring helps to determine if the traffic related to the applications 415 is such that it should alter the behavior of radio link states. In one embodiment, the link state behavior is altered for some of the application categories. For example, operators consider applications such as P2P networks to put an excessive demand on the available bandwidth, especially when a user is more concerned with the responsiveness of visible applications, such as a web browser. The optimization system 305 combines knowledge of subscription plan categories with knowledge of application categories to further limit situations where link state transitions are altered.

The activity, environment, and load monitor module 615 readies the link state for data transfer. In one embodiment, transitions away from idle-wait states are initiated ahead of application data traffic arriving into link layer buffers. For example, in the case of a user viewing the first page of a website, any keystrokes or mouse movement indicates that the user may be preparing to view the second page. Thus, the keystrokes and mouse movement serve as indicators that the link layer should transition from idle to active.

Both the network elements 405 and the user equipment 400 are capable of monitoring stack layer buffer pools and observing signaling protocol messages. Key stroke and mouse click events, however, can only be monitored when the optimization system 305 is stored on the user equipment 400.

In one embodiment the activity, environment, and load monitor module 615 predicts user behavior based on past behavior. The past behavior is inferred from logs. For example, when users access the Google search engine, they typically access the second page. Users that visit ESPN, on the other hand, rarely read the second page. As a result, the optimization system 305 prefetches the second page when a user accesses the Google search engine but not EPSN to optimize responses and reserve resources.

In many situations, the time lag between recognition of an application that is ready to transfer data and the actual arrival of data packets at the link layer 410 is longer than transition from idle-wait time state to the ready state. The activity, environment, and load monitor module 615 recognizes that in these situations, the default transition out of ready state into an idle-wait time state is preferred.

State Transition Control Module

Figure 7:
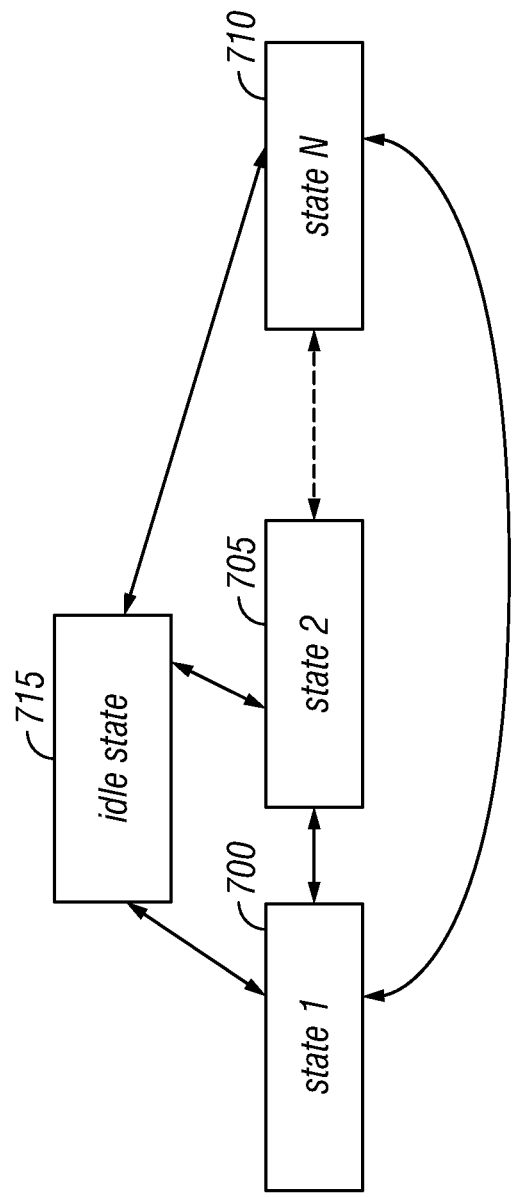
FIG. 7 illustrates a block diagram of different transition states.

The state transition control module 605 supports N states based upon distinct delay characteristics at the link layer 410. FIG. 7 illustrates the different states and their transitions. There are N number of states that can proceed in sequential order, e.g. State 1 700 to State 2 705 to State N 710. Each of these states can also transition to and from an idle state 715. The state transition control module 615 tracks the different states that occur for the radio network. A typical tri-state implementation for HSPA R5, for example, will maintain idle, ready, and intermediate states.

The state transition control module 615 delays transitions between different states and invokes early transitions based on the user equipment 400 battery life, whether the user equipment 400 is connected to an A/C power outlet, a spectral cost, and a backhaul cost. With regard to the user equipment 400 battery life, certain devices, such as handsets, laptops, and netbooks have limited battery life. Because longer ready states result in an increased drain on the battery, battery life may be the primary reason for not delaying transitions on handsets. When the optimization system 305 is stored on the user equipment 400, the state transition control module 615 determines whether to delay transitions among states based on the current data session.

User equipment 400, such as laptops and netbooks are often stationary and connected to an A/C outlet. The state transition control module 615 monitors the A/C outlet connectivity to determine whether to delay transitions among states.

A delayed transition causes a marginal increase in radio resources for the corresponding duration because of additional radio layer messages on the link channels. For example, the HSPA network uses the random access channel (RACH) to synchronize the user equipment 400 with the Node B and while RACH is not a dedicated state, it still remains connected.

Spectral cost (also known as bandwidth cost) refers to the information rate that is transmitted over a specific bandwidth. Spectral cost considers the impact on radio channel collision, a noise ratio, a noise margin, and the user equipment 400 that are likely to remain in a ready state.

Backhaul refers to the link that connects each Node B to the RNC. Backhaul includes wire line connection from Node B, RNC, service general packet radio service (GPRS) support node (SGSN), and the GPRS gateway support node (GGSN) in a HSPA network. The backhaul is impacted by keep-alive messages, which are messages generated by the TCP/IP stack to verify that the computer at the remote end of a connection is available. Keep-alive messages extend link states. In a loaded network, loading on the radio access bearer (RAB) resources and IuB, which is the backhaul between the Node B and RNC in a HSPA network, bandwidth due to keep-alive messages is small but important.

Channel State Influencer

The channel state influencer module 610 tracks information that is used to influence link state transition. The link layer transitions are influenced by direct messaging from the optimization system 305 into the channel; ping messages, which are used to test the presence of an active client; and keep-alive messages. Radio link modems in the user equipment 400 support an AT-command interface (AT refers to ATtention, which designates the beginning of a command line). User equipment 400 side implementation of the channel state influencer module 610 uses the AT-command interface to conditionally maintain the radio link in a more desirable state. This is unlikely to impact the backhaul cost.

When the optimization system 305 is stored on the user equipment 400, direct messaging is implemented, for example, using RRC messages in a HSPA network. This is illustrated in FIG. 5 as an RRC configuration message being transmitted from the network element 405 to the user equipment 400. When the optimization system 305 is stored on the network element 405, direct messaging is additionally used to manage the link state on the clientless user equipment 400.

Ping messages include the Internet control message protocol (ICMP) message, which is a frequently used mechanism for detecting the presence of user equipment 400 at the remote end. The size of the IMCP message is tailored to fit into the smallest possible link layer 410 frame to minimize the resulting overhead. In one embodiment, the ICMP message is used when the optimization system 305 is stored on a gateway, i.e. as part of the network element 405.

In one embodiment, the keep-alive message is implemented as a higher layer scheme, for example, a TCP layer keep-alive message. The keep-alive message scheme works when the optimization system 305 is stored either on the network element 405 or the user equipment 400. A TCP keep-alive packet is an acknowledgment (ACK) with the sequence number set to one less than the current sequence number for the connection. The packets are already used by a user equipment 400 application that performs a long series of calculations and needs to know that the host is reachable and ready to receive the results at the end of the calculation. TCP based keep-alive messages enable the network element 405 to be located deeper within the Internet, away from the RAN and still achieve optimization system 305 functionality.

Figure 8:
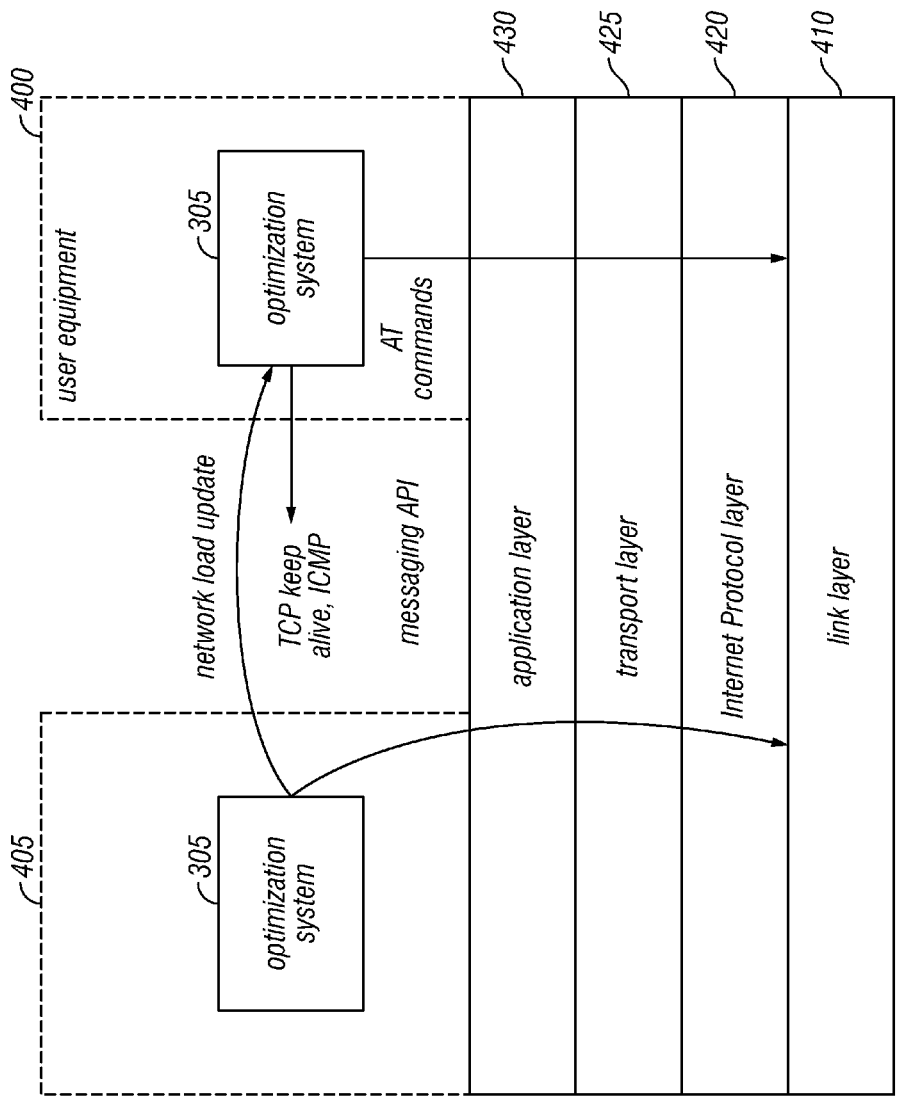
FIG. 8 illustrates a block diagram of an embodiment of an optimization system that is stored on both the network element and the user equipment.

The TCP based keep-alive message also enables a lightweight client side implementation of the optimization system 305 to be delivered as a user equipment 400 side browser plug-in. FIG. 8 illustrates a block diagram of such an implementation where the optimization system 305 is stored in part on the network element 405 and in part on the user equipment 400. The TCP keep-alive message is transmitted from the user equipment 400 side optimization system 305 along with ICMP messages or from the network element 405 to the user equipment 400. AT commands are transmitted directly to the link layer 410. The portion of the optimization system 305 on the network element 405 uses a messaging application program interface (API) to interact with the link layer 410 and transmits network load updates to the optimization system 305 stored on the network element 405.

Policy and Preference Handler

The policy and preference handler module 620 tracks policies and preferences that influence state transitions. In one embodiment, transitions are enabled or disabled based on policies associated with a bearer technology type, the type of user equipment 400, a user's subscription plan, and the level of load on the radio network. Most cellular data service coverage is achieved through hybrid bearer technologies. As a result, the user equipment 400 encounters different bearer technologies based on the user equipment 400 device location and/or the time of day. Link states and transitional behavior differ across different bearer technologies. For example, 2G technologies do not have as rich a set of link states as 3G, leaving little scope for enhancing. 4G technologies may provide a richer set of states. The decision of how to dynamically control extended state transitions considers all these factors. Storing at least part of the optimization system 305 on the network element 405, furthermore, provides the advantage of easy access to network load metrics and bearer information.

The policy and preference handler module 620 also considers subscription plan and user equipment 400 categories. The policy and preference handler module 620 interfaces with different network elements 405 within the network. When the optimization system 305 is stored on the network element 405, it receives policy control information directly from the network element 405. Subscription plan based state extension ensures that the premium subscription plans receive a maximum benefit with an option to disable for low-budget subscription plans on networks with a severe load. Policies based on a user equipment 400 type are used to selectively disable the functionality for devices, such as user equipment 400 with low battery capacity or for when battery power drops below a threshold.

In one embodiment, the optimization system 305 includes a mechanism that allows the feature to be disabled for the user equipment 400.

EXAMPLE 1

Optimization System Features for a HSPA Network

Figure 9:
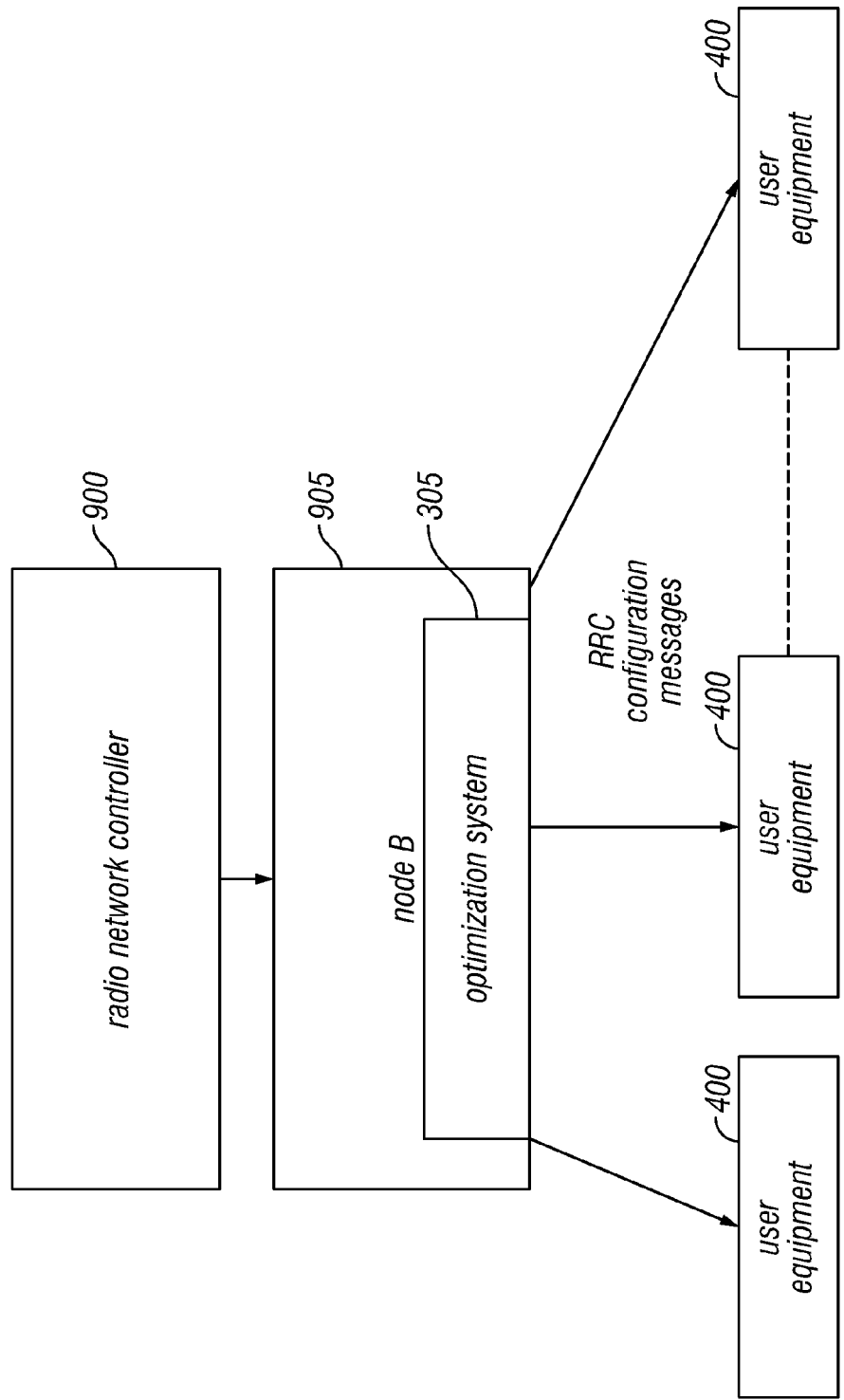
FIG. 9 a block diagram that illustrates the different components in a HSPA network.

The following example is a simple implementation of the optimization system 305 for providing enhanced browsing experience to users on a netbook subscription plan under low and moderate load conditions. FIG. 9 is a block diagram that illustrates the different components in a HSPA network. The network element includes an RNC 900 and a Node B 905 that contains the optimization control system. The RNC makes policy control decisions. The Node B 905 is aware of network congestion and transmits data to the user equipment 400.

The activity, environment, and load monitor module 615 monitors already available load metrics on the RNC/Node B to enable state extensions in low and moderate load conditions. The state transition control module 605 is a tri-state implementation comprising a ready state (CELL_DCH), an intermediate state (CELL_FACH), and idle (Disconnect state). Normal transition away from a ready state to an intermediate state is extended for a subscriber in low to moderate load conditions. Transitions from an intermediate to an idle state are extended for subscribers in low load conditions.

The channel state influencer module 610 uses a direct messaging method, i.e. RRC configuration messages to influence the user equipment 400 to stay in ready and/or intermediate states. The RNC/Node B generates these messages selectively based on the degree of congestion in the network area in which the user equipment 400 is located. RNC/Node B selectively broadcasts RNC configuration messages for the user equipment 400 type laptops. This implementation enables laptop users in unloaded networks to experience superior response times.

The policy and preference handler module 620 only allows subscribers using a netbook device to access certain features. In one embodiment, the preferences are set to switch from speed to battery stretch based on the user equipment 400 conditions. Further, the states are downshifted or stay high longer based on the type of website and the user's behavior and/or historical behavior. Lastly, in addition to considering the current load, the policy and preference handler module 620 changes state behavior based on time of day, location, and user privileges.

Flow Diagram

Figure 10:
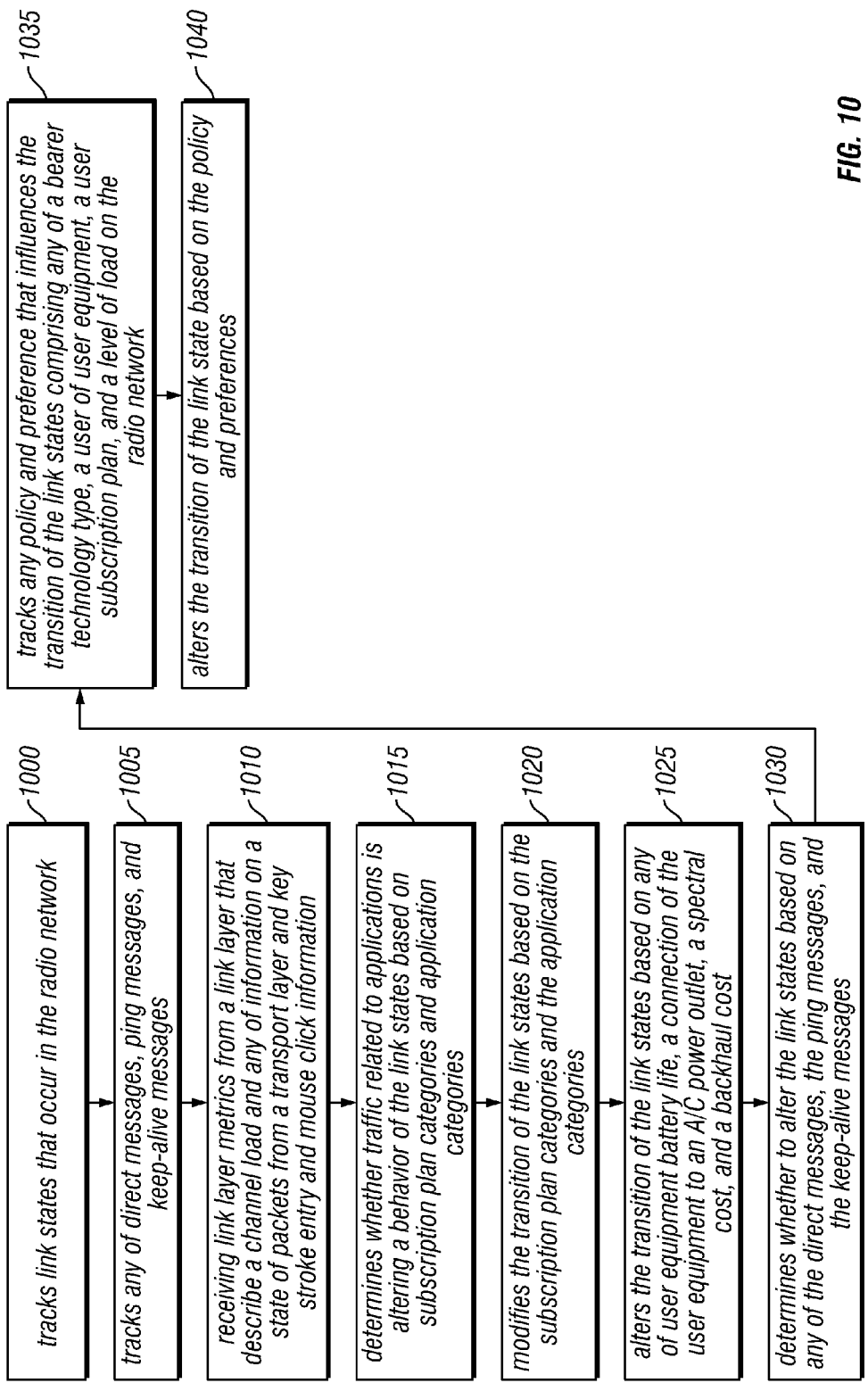
FIG. 10 is a flow diagram of a preferred method for optimizing transition states.

FIG. 10 is a flow diagram that illustrates the steps for optimizing communications on a radio network. The state transition control module 605 tracks 1000 the link states in the radio network. The channel state influencer module 610 tracks 1005 any of direct messages, ping messages, and keep-alive messages. The activity, environment, and load monitor module 615 receives 1010 link layer metrics from a link layer that describes a channel load and any of information on a state of packets from a transport layer and key stroke entry and mouse click information. The activity, environment, and load monitor module 615 determines 1015 whether traffic related to applications is altering a behavior of the link states based on subscription plan categories and application categories. The activity, environment, and load monitor module 615 modifies 1020 the transition of the link states based on the subscription plan categories and the application categories.

The state transition control module 605 alters 1025 the transition of the link states based on any of user equipment battery life, a connection of the user equipment to an A/C power outlet, a spectral cost, and a backhaul cost.

The channel state influencer module 610 determines 1030 whether to alter the link states based on any of the direct messages, the ping messages, and the keep-alive messages.

The policy and preference handler module 620 tracks 1030 any policy and preference that influences the transition of the link states comprising any of a bearer technology type, a user of user equipment, a user subscription plan, and a level of load on the radio network. The policy and preference handler module 620 alters 1035 the transition of the link state based on the policy and preferences.

EXAMPLE 2

Impact of Optimization on TCP

Typically, when a user first reads a webpage, the user takes about 30 seconds of read time. In a TCP model, the user equipment 400 transitions from disconnect to active state before the user has finished reading. FIG. 1 illustrates packet delay associated with transitioning from disconnect to DCH state. FIG. 2 illustrates packet delay associated with transitioning from FACH to DCH state.

Figure 11:
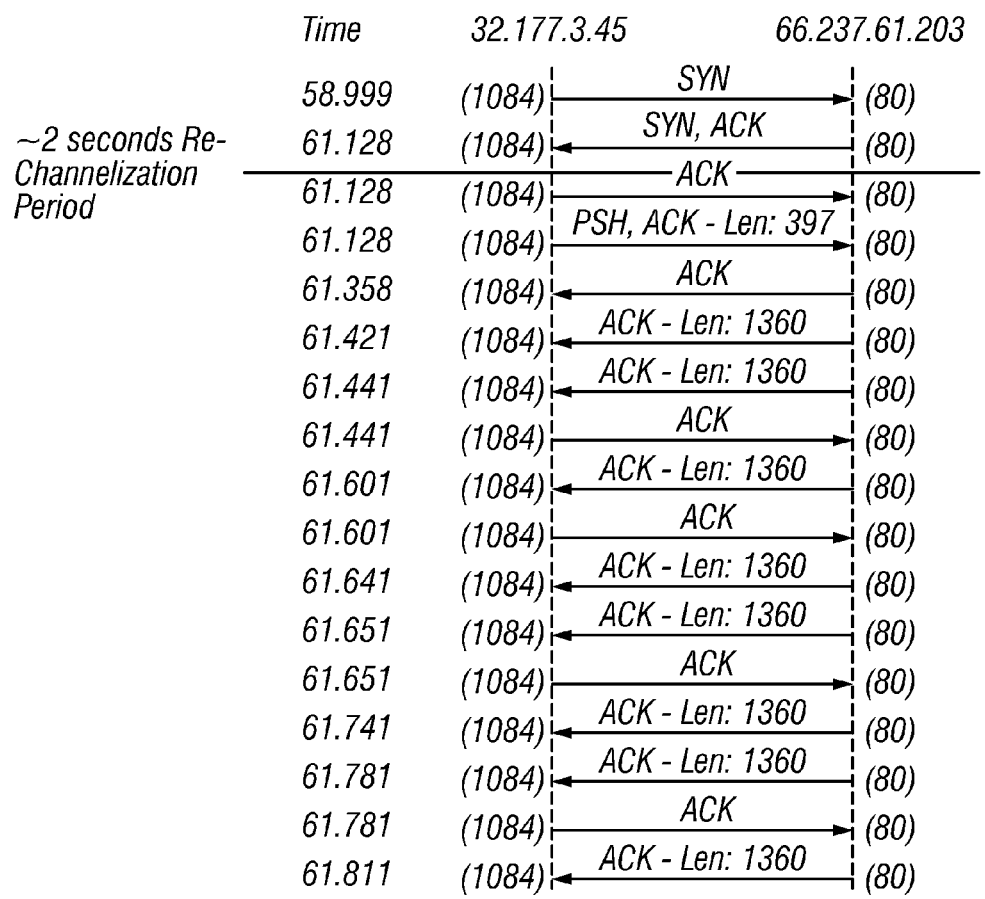
FIG. 11 illustrates the impact of idle-wake-time packet exchange on TCP.

FIG. 11 illustrates a preferred embodiment of the invention where the impact of idle-wake-time packet exchange on TCP increases the delay to over 2.8 seconds. The re-channelization takes two seconds; 0.8 more seconds elapse before the first packet is read.

Figure 12:
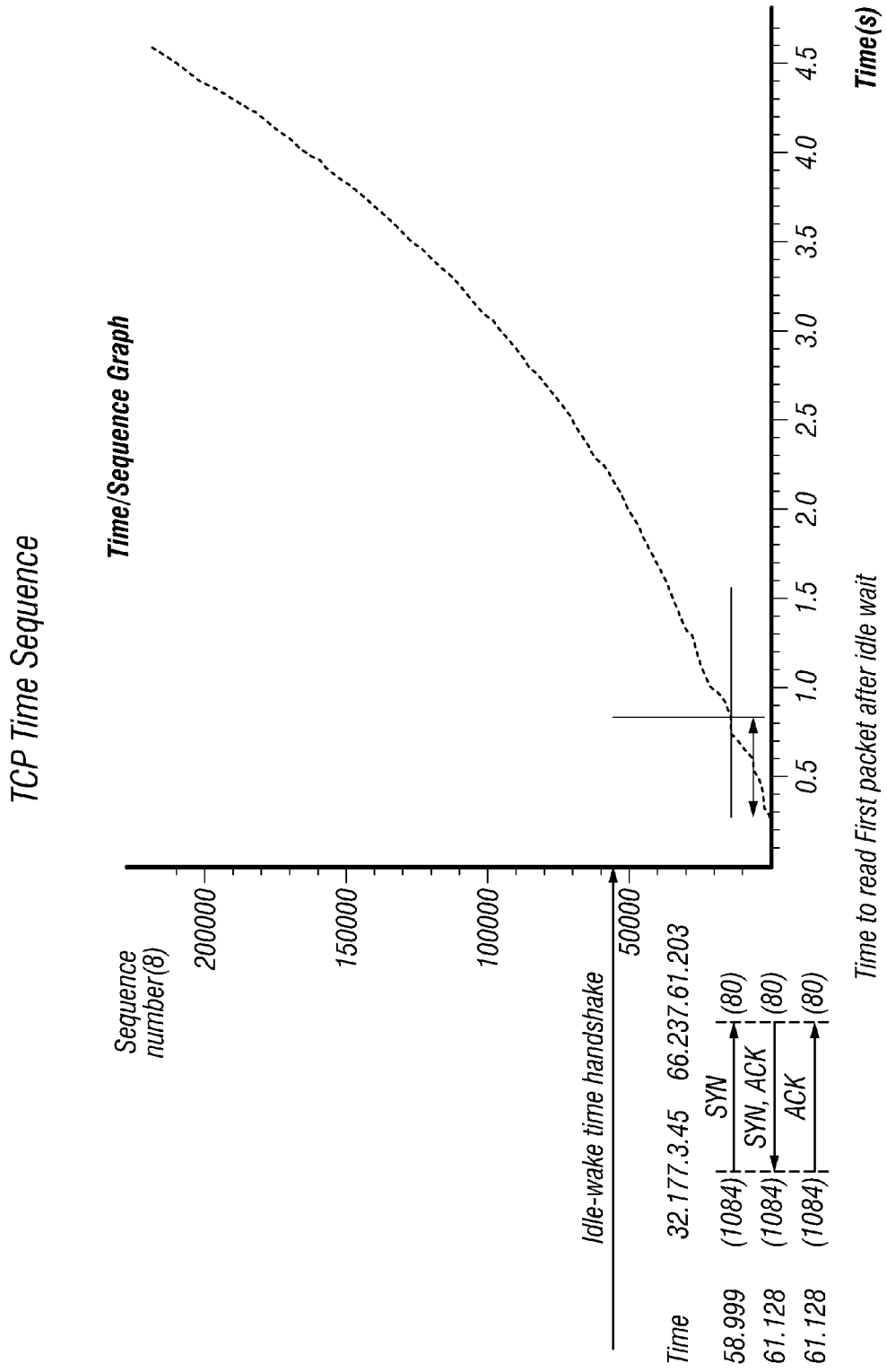
FIG. 12 illustrates the TCP time sequence.

FIG. 12 illustrates the TCP time sequence. The idle-wake time handshake time lasts about 2 seconds. Once that stage is complete, it takes less than a second to read the first packet after idle wait.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A process for optimizing communications on a wireless network between a client device and a network element, the process comprising the steps of:
    tracking link states that occur in the wireless network;
    receiving metrics that describe any of: a channel load, a state of packets from a transport layer, or user interaction with a client device;
    wherein the received metrics describe user interaction with the client device that is monitored by an optimization system stored on the client device;
    determining whether traffic related to at least one application is altering a behavior of at least one of the link states based on a subscription plan category and an application category; and
    modifying a transition of at least one of the link states based on the received metrics and any of: the subscription plan category and application category, a spectral cost indicating an information rate that is transmitted over a specific bandwidth, a backhaul cost indicating the impact of messages on bandwidth, or at least one message.

2. The process of claim 1, further comprising the steps of:
    tracking any of a policy or a preference that influences the transition of at least one of the link states; and
    altering the transition based on the policy or preference.

3. The process of claim 2, wherein the policy or preference comprises any of a bearer technology type, a type of the client device, a user subscription plan, or a load level on the wireless network.

4. The process of claim 1, wherein the at least one category comprises any of a subscription plan category or an application category.

5. The process of claim 1, wherein the at least one message comprises any of a direct message sent over the wireless network, a ping message, or a keep-alive message.

6. The process of claim 1, further comprising the step of:
    tracking the at least one message.

7. The process of claim 1, wherein the link states comprise any of a ready state, an intermediate state, or an idle state.

8. The process of claim 1, wherein the wireless network comprises any of a high speed packet access (HSPA) network, a code division multiple access (COMA) network, a world-wide interoperability for microwave access (WiMAX) network, or a long term evolution (LTE) network.

9. The process of claim 1, further comprising the step of:
    predicting user behavior associated with the client device based on past user behavior associated with the client device.

10. The process of claim 1, wherein the process is performed at any of the client device, the network element, or any combination thereof.

11. A process for optimizing communications on a wireless network between a client device and a network element, the process comprising the steps of:
    tracking link states that occur in the wireless network;
    receiving metrics that describe any of: a channel load, a state of packets from a transport layer, or user interaction with a client device;
    wherein the user interaction with the client device comprises an indication that a link layer of the client device should transition to a ready state;
    determining whether traffic related to at least one application is altering a behavior of at least one of the link states based on a subscription plan category and an application category; and
    modifying a transition of at least one of the link states based on the received metrics and any of: the subscription plan category and application category, a spectral cost indicating an information rate that is transmitted over a specific bandwidth, a backhaul cost indicating the impact of messages on bandwidth, or at least one message.

12. An apparatus for optimizing communications on a wireless network between a client device and a network element, wherein the apparatus comprises:

a memory comprising an optimization system application;
at least one processor, wherein the at least one processor is configured by the optimization system application to:
track link states that occur in the wireless network;
receive metrics that describe any of: a channel load, a state of packets from a transport layer, or user interaction with a client device;
wherein the received metrics describe user interaction with the client device that is monitored by an optimization system stored on the client device;
determine whether traffic related to at least one application is altering a behavior of at least one of the link states based on a subscription plan category and an application category; and
modify a transition of at least one of the link states based on the received metrics and any of: the subscription plan category and application category, a spectral cost indicating an information rate that is transmitted over a specific bandwidth, a backhaul cost indicating the impact of messages on bandwidth, or at least one message.

13. The apparatus of claim 12, wherein the processor is further configured to track any of a policy or a preference that influences the transition of at least one of the link states; and alter the transition based on the policy or preference.

14. The apparatus of claim 13, wherein the policy or preference comprises any of a bearer technology type, a type of the client device, a user subscription plan, or a load level on the wireless network.

15. The apparatus of claim 12, wherein the at least one category comprises any of a subscription plan category or an application category.

16. The apparatus of claim 12, wherein the at least one message comprises any of a direct message sent over the wireless network, a ping message, or a keep-alive message.

17. The apparatus of claim 12, wherein the at least one processor is configured to track the at least one message.

18. The apparatus of claim 12, wherein the link states comprise any of a ready state, an intermediate state, or an idle state.

19. The apparatus of claim 12, wherein the wireless network comprises any of a high speed packet access (HSPA) network, a code division multiple access (CDMA) network, a worldwide interoperability for microwave access (WiMAX) network, or a long term evolution (LTE) network.

20. The apparatus of claim 12, wherein the at least one processor is configured to predict user behavior associated with the client device based on past user behavior associated with the client device.

21. The apparatus of claim 12, wherein the at least one processor is located at any of the client device, the network element, or any combination thereof.

22. An apparatus for optimizing communications on a wireless network between a client device and a network element, wherein the apparatus comprises:
a memory comprising an optimization system application;
at least one processor, wherein the at least one processor is configured by the optimization system application to:
track link states that occur in the wireless network;
receive metrics that describe any of: a channel load, a state of packets from a transport layer, or user interaction with a client device;
wherein the user interaction with the client device comprises an indication that a link layer of the client device should transition to a ready state;
determine whether traffic related to at least one application is altering a behavior of at least one of the link states based on a subscription plan category and an application category; and
modify a transition of at least one of the link states based on the received metrics and any of: the subscription plan category and application category, a spectral cost indicating an information rate that is transmitted over a specific bandwidth, a backhaul cost indicating the impact of messages on bandwidth, or at least one message.

23. A client device implemented over a wireless network, comprising:
a mechanism for sending and receiving wireless signals; and
at least one processor, wherein the at least one processor is configured to:
track link states that occur in the wireless network;
receive metrics that describe any of: a channel load, a state of packets from a transport layer, or user interaction with the client device;
wherein the received metrics describe user interaction with the client device that is monitored by an optimization system stored on the client device;
determine whether traffic related to at least one application is altering a behavior of at least one of the link states based on a subscription plan category and an application category; and
modify a transition of at least one of the link states based on the received metrics and any of: the subscription plan category and application category, a spectral cost indicating an information rate that is transmitted over a specific bandwidth, a backhaul cost indicating the impact of messages on bandwidth, or at least one message.

24. The client device of claim 23, wherein the processor is further configured to:
track any of a policy or a preference that influences the transition of at least one of the link states; and
alter the transition based on the policy or preference.

25. The client device of claim 23, wherein the at least one category comprises any of a subscription plan category or an application category.

26. The client device of claim 23, wherein the at least one message comprises any of a direct message sent over the wireless network, a ping message, or a keep-alive message.

27. The client device of claim 23, wherein the client device comprises any of a personal computer, a notebook, a smart phone, a digital media player, or a personal digital assistant.

* * * * *